LESLIE J. BUNTING
INVENTOR.

ATTORNEYS

LESLIE J. BUNTING
INVENTOR.

ATTORNEYS

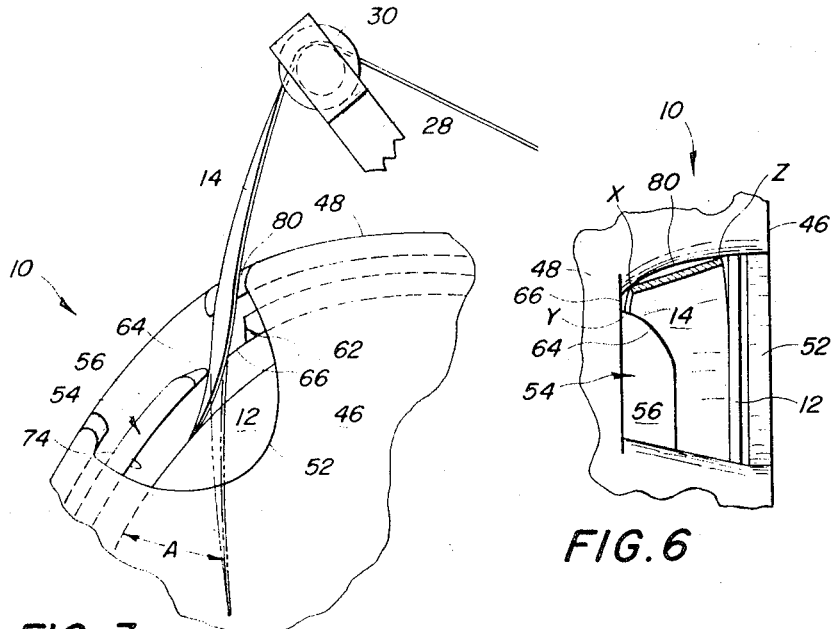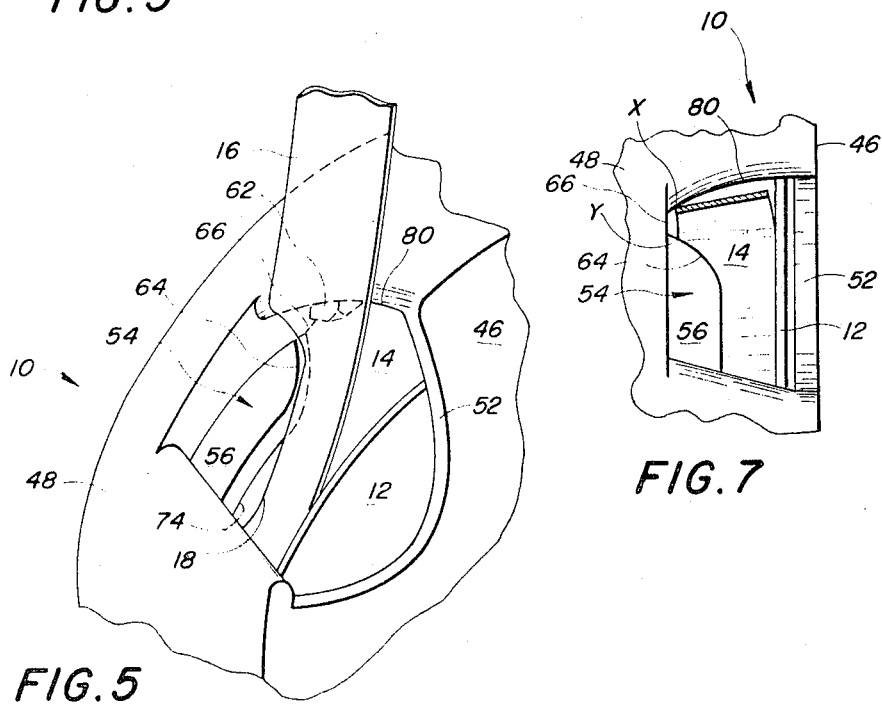

United States Patent Office 3,451,636
Patented June 24, 1969

3,451,636
FILM GUIDE EDGES ON PROJECTION CARTRIDGE
Leslie J. Bunting, Rochester, N.Y., assignor to Eastman Kodak Company, Rochester, N.Y., a corporation of New Jersey
Filed Nov. 1, 1966, Ser. No. 591,153
Int. Cl. G03b 1/04
U.S. Cl. 242—55.13                                    14 Claims

ABSTRACT OF THE DISCLOSURE

A cartridge adapted to contain a roll of strip material and to be retained on a projector or the like has a passageway in an edge wall thereof for guiding the strip material into or out of the cartridge. The passageway includes guide surfaces for imparting a twist to the strip material to reduce the possibility of scratching the central area thereof as it passes through the passageway.

---

Figure 1:
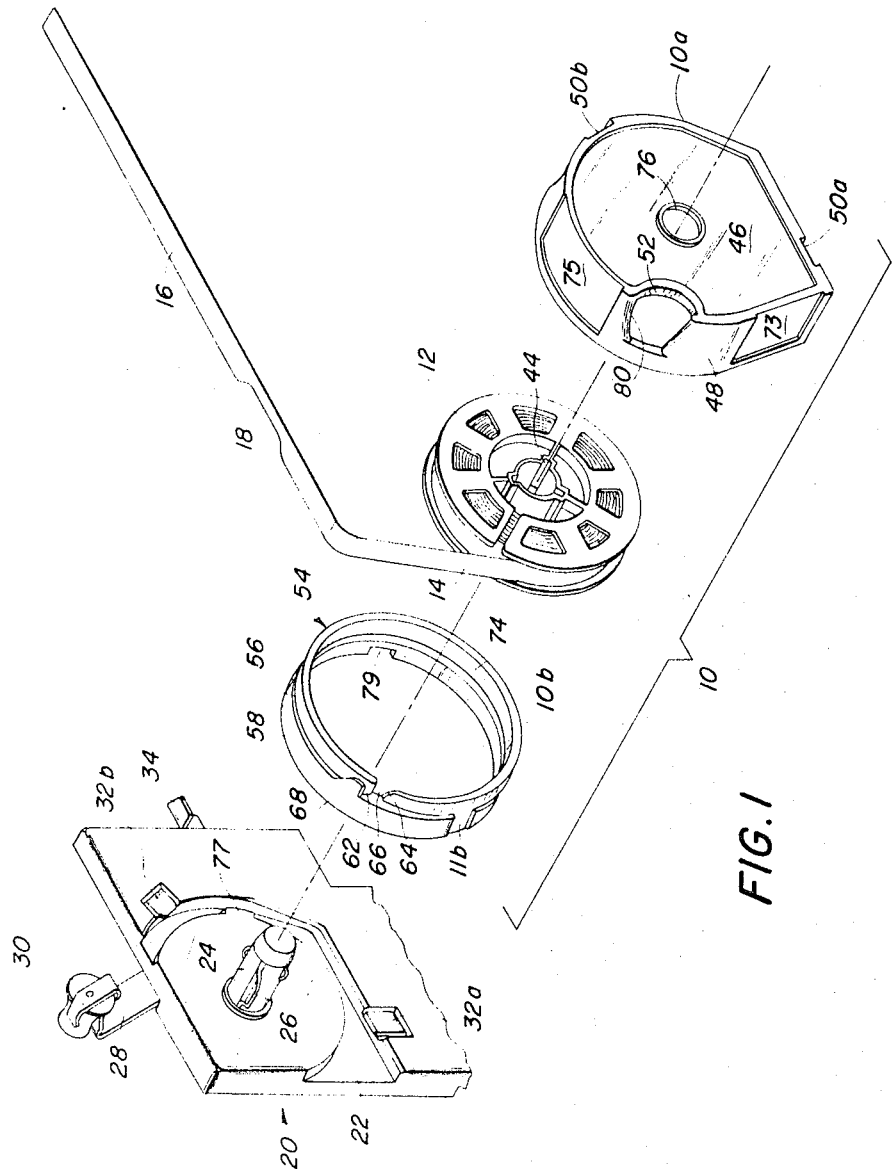

The present invention is directed to the film guide edges in the passageway openings in the outer periphery of the projection cartridge disclosed in copending U.S. application Ser. No. 591,248, entitled, Rim Trap for Photographic Film Projection Cartridge, filed Nov. 1, 1966 by Robert J. Roman.

In the aforementioned copending application is disclosed a cartridge for projecting a reel of strip material in a motion picture projector whereby in order to facilitate conditioning the projector for operation the cartridge is provided with an arrangement by which the film leader is trapped in the outer periphery of the cartridge each time the film is rewound on a reel in the cartridge. This arrangement thus enables the projectionist to readily grasp the leader through a finger opening in the cartridge and remove the film leader from the cartridge for insertion in the automatic threading mechanism of the projector.

The reel on which the film is wound is disposed within the chamber of the cartrirdge, and an annular rim that defines the chamber and thus encompasses the reel is provided with an opening or slot through which the film passes to and from the reel in the chamber. One of the edges defining the opening in the annular rim is curved and serves to shunt the film toward the outer wall of the cartridge, and the opening in the rim is disposed in a predetermined relationship beneath the finger opening in the outer edge of the cartridge. Thus there are the edges of the rim defining the rim opening and of the finger opening that together define two sets of openings constituting passageway openings for the film or strip material and against one edge of each opening the film comes into contact in the course of operation as the film passes from and to the reel in the chamber.

One of the objects of the invention is to reduce the possibility of scratching the picture area on the film as the film passes to and from the cartridge through the two sets of openings or film passageway openings by providing the finger opening of the cartridge with an edge that will be opposed to and offset in height from the shunting edge in the rim opening so that the two edges will define therebetween a path for the film in such manner as to impart a twist to the film with the result that only the edge surfaces on either face of the film will be in simultaneous contact with the two edges.

Figure 2:
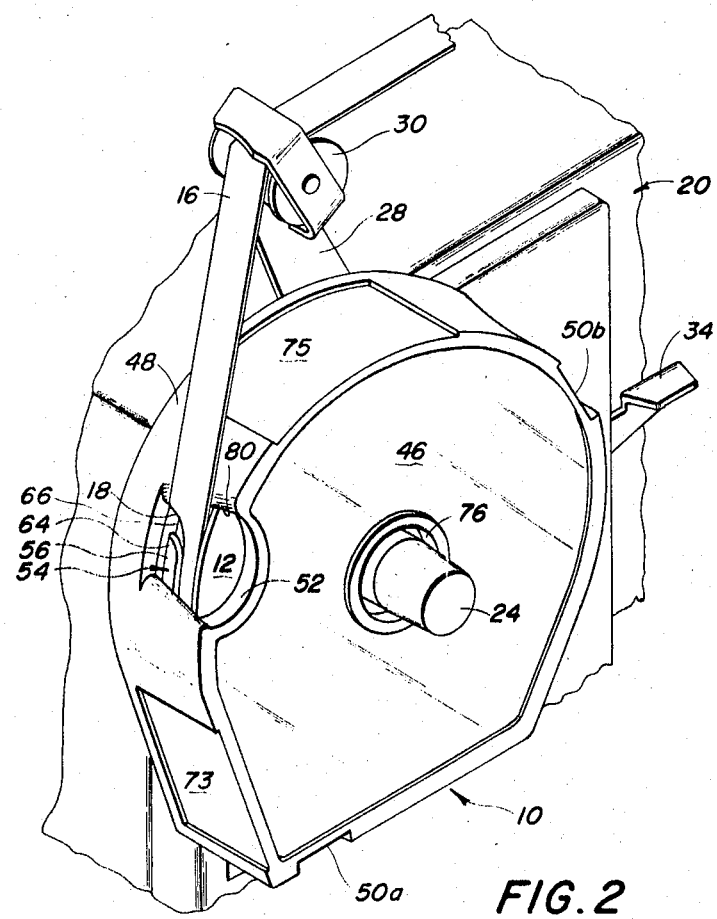
Figure 4:
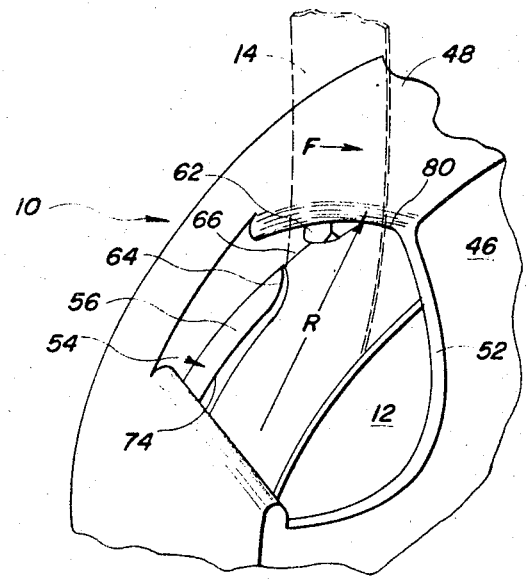

Other objects inherent in the invention will be apparent to those skilled in the art from the drawings, and from the description that follows:

In the drawings:

In FIG. 1 is shown a perspective exploded view of parts of the projection cartridge, of a supply reel of film and illustrating a slot in the edge of the film leader extending from the reel, and of that portion of a film projector adapted to receive the cartridge;

In FIG. 2 is shown an enlarged perspective view of the projection cartridge in operative position on a film projector with the slot portion of the film leader positioned at the opening in the outer periphery of the cartridge;

In FIG. 3 is shown an enlarged fragmentary view of the projection cartridge, reel and idler arm with its idler, and illustrating the edges in the annular rim that define the slot in the rim, the finger opening and the curved guide edge at one side of the finger opening, the imparted twist in the film and the possible range of back angle of the film passing onto the reel;

In FIG. 4 is shown a further enlarged fragmentary view of the projection cartridge and reel and illustrating the edge contact of the film with the curved guide edge of finger opening and the curved shunting edge of the slot in the annular rim;

In FIG. 5 is shown a view similar to FIG. 4 and illustrating the slot in the edge of the film leader as it appears prior to the leader either being trapped in the rimmed area or being pulled out for threading the projector;

In FIG. 6 is shown a view looking down through the finger opening in the cartridge and illustrating the contact of the three edge surfaces on the faces of the film with the two curved edges in the film passageway openings in the cartridge when the projector is in rewind operation; and In FIG. 7 is shown a view similar to FIG. 6 and illustrating the contact of the two edge surfaces on the faces of the film with the two curved edges in the film passageway openings in the cartridge when the projector is either in operation for projecting the film or is at rest.

The projection cartridge of this invention is designed to readily receive and store within a chamber of the cartridge a supply reel of film and to be loaded on a projector for projecting the film while the reel remains within the cartridge. The cartridge is provided with a rimmed area in the outer periphery of the cartridge defined by an annular rim that is spaced from the reel for trapping the film leader for rotation within the rimmed area and which prevents the leader from being wound on the reel so that the projectionist may readily grasp the leader through a finger opening in the periphery of the cartridge and remove the leader for insertion in the automatic threading mechanism of the projector.

The finger opening has a curved film guide edge that is located at the front of the finger opening and is inclined with respect to the axis of the cartridge, as facing toward the front of the projector. The center of the radius of the curved guide edge is offset toward the outer side wall of the cartridge with the result that the finger opening widens as the edge extends to the outer side wall of the cartridge.

The annular rim is provided with an opening defined by a forward edge and a rearward edge, as facing toward the front of the projector, and through which opening the film passes to and from the reel in the chamber. The rearward edge of this opening curves laterally and rearwardly of the opening along the side of the rim that is adjacent the outer wall of the cartridge, and constitutes a "shunting edge" because it serves to shunt or give a side force to the film toward the outer side wall of the cartridge.

The opening in the annular rim and the finger opening are so disposed to each other that in effect the film is guided on one side by the curved guide edge of the finger opening, and on the other side by the shunting edge in the annular rim. In this manner the two opposed curved edges define the path that the film will take as it passes through the passageway openings, and impart a twist to the film so that only its edge surfaces, i.e., edge surfaces on either face of the film adjacent the image area of the film, come into contact with either of the respective curved guide edges.

In reference to the drawings, the projection cartridge is indicated generally at 10 in FIG. 1 wherein the cartridge is shown in two separate parts, the parts are designated as 10a for the outer casing and 10b for the inner cartridge piece. Both the inner cartridge piece and outer casing are preferably formed from a suitable plastic, and the inner cartridge piece is designed to fit in place within the outer casing in proper oriented position. The outer casing may be provided with a key (not shown) which fits within a keyway 11b in the inner cartridge piece to facilitate the orientation of one part to the other.

The reel 12 is also preferably formed from a suitable plastic and may be similar in construction and size as a standard fifty foot reel, for example, which is returned with film that has been developed; obviously, however, the cartridge could be made in sizes appropriate to larger reels. The film on the reel is indicated at 14, and has a leader 16 with a slot 18 formed in one edge of the leader a predetermined distance from the free end of the leader. The purpose of the slot and its manner of cooperation with the cartridge are more fully described in the above-mentioned copending application. The details of the construction of the cartridge and the manner in which the reel is loaded in the cartridge are more fully described in copending U.S. application Ser. No. 591,249, entitled, Projection Cartridge, filed Nov. 1, 1966, by Robert J. Roman.

Only the pertinent portions of a film projector necessary to an understanding of the invention are shown since those portions not shown would be conventional; thus that part of the projector that is shown is indicated at 20. The projector is provided with a recessed support plate 22 (FIG. 1) for receipt of the projector cartridge; a spindle 24 for rotatably supporting the reel 12 in the cartridge; a drive member (not shown) which rewinds the reel by means of the engagement of the spring member 26 on the spindle with the reel; an idler arm 28 and an idler 30 for guiding the film 14 and its leader 16; spring-biased latch devices 32a and 32b for latching the projection cartridge 10 in loaded position on the projector; and a release lever 34 which may not only serve to release the latch devices from the cartridge when the cartridge is to be removed, but also may serve to release the idler arm from its inoperative position (not shown) when the cartridge is to be loaded on the projector so that the arm will rotate counterclockwise to the operative position illustrated in FIGS. 2 and 3.

The reel 12 is provided with drive slots 44, one of which is engaged by the spring member 26 on the projector when the projector has been tripped into a rewind operation to rotate the reel.

The details and manner of operation of the spindle 24 are more fully described in my copending U.S. application Ser. No. 591,315, entitled Spindle for Supporting Reels or Spools for Rotation, filed November, 1966, now abandoned and refiled on Oct. 16, 1967 as continuation application Ser. No. 679,587; of the drive member (not shown) in copending U.S. application Ser. No. 397,451, entitled, Automatic Rewinding Mechanism for Film or the Like, filed Sept. 18, 1964, by Robert J. Roman, and issued Jan. 24, 1967 as Patent No. 3,300,155; and of the latch devices 32a, 32b and idler arm 28 in my copending U.S. application Ser. No. 591,314, entitled Automatic Latching Mechanism and Film Guide Arm for a Cartridge-Loaded Motion Picture Projector, filed Nov. 1, 1966, now abandoned and refiled on Nov. 7, 1967, as continuation application Ser. No. 681,295, and issued July 30, 1968 as Patent No. 3,394,901.

The outer casing 10a of the projection cartridge 10 is provided on one side with a side wall 46, which constitutes the outer wall of the cartridge when the cartridge is loaded on the projector. The cartridge further is provided with a peripheral wall 48 with two recessed surfaces 50a and 50b being formed in the peripheral wall constituting latch locations for locking engagement with a chamfer (not shown) at each recessed surface by the latch devices 32, 32b, respectively. The peripheral wall is parallel to the axis of the cartridge. A finger opening 52 is provided in the outer periphery of the outer casing 10a.

The inner cartridge piece 10b includes an annular rim 54 having an outer surface 56 for receiving and supporting the leader 16, and a surface 58 (FIG. 1) for frictionally engaging in assembled relation the inside peripheral surface (not shown) of the outer cartridge casing.

When the outer cartridge casing 10a and the inner cartridge piece 10b are assembled, the annular rim 54 projects toward but is spaced from the side wall 46, and the outer leader support surface 56 of the rim is spaced from the peripheral wall 48 to form a rimmed area in the outer periphery of the projection cartridge 10 outwardly of the area that constitutes a chamber for the reel, the rimmed area and the chamber each being concentric with the axis of the cartridge.

The annular rim 54 is provided with a forward end edge 62 (as viewed in the direction toward which the film will travel toward the projection gate) and an after end edge 64 which is curved sharply to the rear of the cartridge, i.e., along one side of the rim adjacent the outer side wall of the cartridge, and is termed a "shunting edge" for reasons to be described. The two end edges 62, 64 define a slot 66 (FIG. 1) or opening in the annular rim for passage of the film to and from the reel 12. A ramp 68 (FIG. 1) extends laterally from surface 58 part way onto the outer surface 56 of the annular rim at a location forward of the slot 66. The purpose of the ramp is fully described in the aforementioned rim trap copending application.

The operation of those aspects of the projection cartridge pertinent to this invention will now be described.

The film projector 20, which is only illustrated in part, is capable of alternatively receiving conventional separate supply reels of different sizes for different lengths of film on the projection cartridge of the invention. Normally, when the projector operates with conventional supply reels the idler arm 28 and its idler 30 will be disposed in an inoperative position (not shown) out of the way of such supply reels.

When the projection cartridge 10 is to be used, the cartridge is loaded onto the recessed support plate 22 so that the open side (not shown) of the cartridge faces the support plate, and that the projector spindle 24 extends through the opening 76 formed in cartridge casing side wall 46. An additional key 77 (FIG. 1) may be provided on the recessed plate of the projector for fitting within a keyway 79 (FIG. 1) provided on the inner cartridge piece 10b so as to further ensure the proper orientation of the cartridge to the projector, as shown in FIG. 2. The spring-biased latch devices 32a, 32b are engaged and depressed by the cartridge chamfers (not shown) at one end of the recessed surfaces 50a, 50b on the outer periphery of the cartridge until the latch devices slip over the chamfers into locking engagement with the cartridge. As the latch devices are being depressed, the idler arm 28 and its idler 30 are released from the inoperative position (not shown), and a spring arrangement (not shown) forces the idler to rotate counterclockwise upward into operative position. The operative position of the idler bears a predetermined vertical relationship with respect to the cartridge and its film passageway openings when the cartridge is in loaded position on the projector. The idler arm can be manually depressed into inoperative position, and the latch devices can be released from locking engagement by depression of the release lever 34. Also, if desired, the depression of the release lever may cause release of the idler arm so that it will be free to move to operative position. The full details of the latter arrangement are more fully described in my copending application on the automatic latching mechanism and film guide arm.

The projectionist grasps the film leader 16 from the outer periphery of the cartridge through finger opening 52 and extends the leader over the idler 30 on idler arm 28 and then into the automatic threading mechanism (not shown) of the projector for subsequent projection of the film. The inner end of the film is preferably held by a clip (not shown) to the reel so that the film will always remain connected to the reel. Thus when the film has been projected, the projector may be arranged to be automatically stopped or automatically tripped into re-wind operation when the film resists further unwinding.

When the projector is tripped into rewind operation, the drive member (not shown) of the projector is clutch-engaged with the spindle 24 to rotate the spindle in the rewind direction. The spindle rotatably drives the reel by means of the engagement of spring member 26 on the spindle within one of the reel drive slots 44.

The film 14 is thereby rewound into the cartridge 10 and onto the reel 12 with the film leader 16 being trapped in the rimmed area outwardly of the chamber on surface 56 of the annular rim 54. The leader then continues to rotate around the outer surface 56 until the projector is shut-off.

The narrowed portion of the film leader at the area of the slot 18 in the edge of the film leader 16 serves to connect and bridge the distance between the outer rim surface 56 and the film on the reel 12 as the portion extends down between the space bordered by the rim edge adjacent outer surface 56 and the cartridge outer side wall 46. This is illustrated partly in FIG. 5.

As previously mentioned, the after end edge 64 in the annular rim 54 is curved; also, the surface of the after end edge adjacent slot 66 is lower than the surface of the forward end edge adjacent slot 66, as illustrated in FIG. 3, so that the narrowed portion of the trapped leader at the area of the slot 18 will more readily bridge over slot 66 as the leader rides around rim surface 56 until the projector is shut-off. The details of this operation, however, are more fully described in the copending application relating to the rim trap arrangement.

FILM GUIDE EDGES

One of the purposes of this invention is to further ensure the reliability of the rim trap arrangement so that the film leader will be trapped in the outer periphery of the cartridge every time the film is rewound into the cartridge. Another purpose is to reduce the possibility of the picture area of the film being scratched as the film passes into and out of the cartridge through the two passageway openings.

The film, as it is disposed in nearly vertical relationship to the passageway openings by the idler arm 28, rides simultaneously against the rim after end edge 64 and the forward edge 80 of the finger slot 52 as the film passes into and out of the two passageway openings in the cartridge, as shown in FIG. 3.

The curve of the rim after end edge 64 tends to shunt the film toward the cartridge outer side wall 46 as the film rides in engagement thereagainst. As the edge of the narrowed portion of the film leader at the area of the slot 18 approaches edge 64 during the rewind operation, the narrowed portion is thus shunted around the curved edge where the portion then rides along the rim edge rearwardly of edge 64 in the space between the rim and the cartridge outer side wall 46. The width of this space is less than the width of the film leader. When the forward shoulder portion of the leader slot 18 reaches the after end edge 64 the shoulder portion is pulled onto the outer rim surface 56 along with the following portion of the leader. The trapped leader portion thus rides around on surface 56; the narrowed portion of the leader rides in the space between the rim and outer side wall 46 and bridges the distance between surface 56 and the reel 12; while the film remains wound on the rotating reel.

It will be noted, for example, from FIG. 3, that the portion of the idler 30 over which the film is guided to the film gate (not shown) is slightly forward of or offset from the forward edge 80 of the finger opening 52. The film thus bends slightly over edge 80 as the film passes into and out of the cartridge. In this manner the continuous engagement of the film against edge 80 is ensured.

It will also be noted from FIG. 3 that the forward end edge or rim shunting edge 64 is slightly rearward of or offset from the forward edge 80 of the finger opening 52, and that the point of tangency where the film passes onto or off from the reel is also rearwardly of or offset from edge 64. The film thus bends slightly over edge 64 as the film passes into and out of the chamber of the cartridge. In this manner the continuous engagement of the film against edge 64 is ensured.

The center of the radius R (FIG. 4) of the curved forward edge 80 of the finger opening 52 is rearwardly of the finger opening and is offset toward the outer side wall 46 of the cartridge, and the finger opening thus widens at its forward edge as the edge extends laterally to the outer side wall. In other words, the forward edge 80 in the peripheral wall 48 is not only inclined with respect to the axis of the cartridge, but also presents a curved surface with respect to the one face of the film as the film is guided therepast. The curved forward edge 80 then, by virtue of the offset relationship of its radius center, causes the film to be forced laterally in direction F (FIG. 4) toward the outer side wall 46, because the film will tend to follow the shortest path between the outer convolution of film on the reel and the idler on the idler arm.

In other words, that portion of the film on the reel side of the film passageway openings as the film passes onto or off from the reel 12, and that portion of the film on the idler arm side of such passageway openings as the film passes over the idler, each tends to follow a straight path. The two opposed and offset curved edges 64, 80 by the very character of their disposition in defining a path through the passageway openings for the film, however, impart a twist to the film portion that is within the passageway openings since the film will be shunted toward the outer side wall until an edge of the film will be stopped by the reel flange adjacent the outer side wall. The result is that only the edge surfaces on either face of the film will come into contact with either of the edges 64, 80 as the film passes through the cartridge passageway openings.

In viewing FIG. 7, then, the inner edge portion of the film in the passageway openings only comes into contact with curved edge 80 at a point on the front edge surface, i.e., on the front face of the film where it is designated X, and with curved edge 64 at a point on the rear edge surface, i.e., on the rear face of the film where it is designated Y. The outer edge portion of the film as well as the area of the film that would constitute the picture area are out of contact with curved edge 80, as well as with curved edge 64. The two surface edge contact condition of the film in the passageway openings, as illustrated in FIG. 7, exists when the film is being advanced through the projector as well as when the projector is halted. There is relatively little tension on the film at either of these times from either the reel or from the feed claw film advancing mechanism (not shown) of the projector.

When the projector is tripped into rewind operation tension is then exerted on the film on the one hand in one direction by its engagement within the automatic threading mechanism and on the other hand in the opposite direction by the reel being rotatably driven in rewind operation. It is at this time that a further twist is imparted to the film in the passageway openings with the result that the outer edge portion of the film, i.e., the portion adjacent the outer side wall 46 of the cartridge, also comes into contact with curved edge 80 at a point on the front edge surface, i.e., on the front face of the film where it is designated Z, and resulting in a three surface edge contact condition as illustrated in FIG. 6. The picture area of the film does not, however, come into contact with either curved guide edge 80 or curved guide edge 64.

The above-described film guide edges thus reduce the possibility of scratching of the picture area of the film. The arrangement also ensures reliability of the rim trap arrangement by making it possible to reduce the distance between the forward end edge 62 and the after end edge 64 in the annular rim. In this manner the narrowed portion of the film leader at the area of the slot 18 will be more readily shunted to one side of the rim and the leader portion following will be pulled onto rim surface 56 to trap the leader in the outer periphery of the cartridge. Also, when the leader is trapped on the rim surface and rotating around the surface, the narrowed portion will more readily bridge over the slot 66 in the rim rather than possibly slipping through the slot to be wound on the reel. One advantage of this arrangement will be appreciated when it is realized that it is not necessary to shut the projector off immediately when the rewind operation is completed. If the projectionist is lecturing to a group he may wait to turn off the projector after he has completed making whatever remarks he wished to say.

A further advantage of the above described arrangement is that an adequate back angle A (FIG. 3) will be ensured with the result that the rim trap arrangement will work over a wider range of film footages on the supply reel. The "back-angle" represents the angle that the film portion makes with the reel at the point of tangency of the film on the reel at a minimum diameter, and at the point of tangency of the film on the reel at a maximum diameter, each when the slot 18 in the film leader arrives at the cartridge passageway openings.

Although the strip material discussed herein has been referred to as film, it will be appreciated that the invention would also be applicable to other strip material such as magnetic tape providing the leader is made of stiffer material than the tape.

The invention has been described in detail with particular reference to the preferred embodiment thereof, but it will be understood that variations and modifications can be effected within the spirit and scope of the invention.

I claim:
1. A cartridge adapted to contain a roll of strip material defining a rotational axis, and adapted to be received by a device through which the strip material is movable, the cartridge comprising: a casing comprising a peripheral wall and a side wall, said peripheral wall and said side wall defining a chamber for receiving the roll of strip material with the rotational axis of the roll extending generally normal to said side wall, said peripheral wall defining a passageway from said chamber and having surfaces in said passageway defining first and second curved guide edges for guiding the strip material through said passageway, said first guide edge having a generally diagonal orientation in relation to said side wall to impart a twist to the strip material as it is guided through said passageway.

2. A cartridge as claimed in claim 1 wherein said casing has two sides, wherein said side wall defines one of said sides, and wherein said surfaces defining said first and second guide edges extend generally toward said side wall from a location adjacent the other of said sides, said edges being closely spaced adjacent said other side and diverging with respect to each other as they extend toward said one side.

3. A cartridge as claimed in claim 1, wherein said second guide edge has a width in a direction parallel to the roll rotational axis that is less than the width in the same direction of the strip material on the roll.

4. A cartridge having two sides and adapted to contain a roll of film defining a rotational axis, comprising: a casing having a side wall defining one of the sides and a peripheral wall extending from said side wall toward the other of the sides, said peripheral and side walls defining a chamber adapted to rotatably receive the roll of film with the rotational axis thereof normal to said side wall, said peripheral wall defining an opening into said chamber from outside said casing having spaced juxtaposed curved guide edges for contacting and guiding the film through said opening, each of said guide edges extending from a position adjacent said other side toward said one side such that said guide edges urge the film laterally toward said side wall as the film passes through said opening over said guide edges.

5. A cartridge as defined in claim 4 wherein one of said guide edges is spaced from the other guide edge both angularly relative to the rotational axis of the roll and radially away from the longitudinal axis of the roll, and wherein said guide edges curve away from each other and said one guide edge is curved less than said other guide edge.

6. A cartridge as defined in claim 4 further including a reel for supporting the roll of film within said chamber, said reel comprising a flange positioned adjacent said side wall, whereby an edge of the film will be urged into engagement with said flange by said guide edges and the flange will prevent the edge of the film from engaging said side wall.

7. A cartridge adapted to rotatably contain a roll of film having a rotational axis and adapted to be supported by a motion picture projector, the cartridge comprising:
a casing having a peripheral wall and a side wall, said walls defining a chamber for the roll of film, said walls further defining a passageway having two sides and extending into said chamber for movement of the film into and out of said chamber;
means defining a first surface on one side of said passageway for engaging only the edge portion of one face of the film; and
means defining a second surface on the other side of said passageway for engaging only the edge portion of the other face of the film;
said second surface being spaced from said first surface both angularly about the rotational axis of the roll and radially toward the rotational axis of the roll, said first and second surfaces cooperating to define therebetween a guide path for the film when the film passes into or out of said cartridge.

8. A cartridge as defined in claim 7, wherein said casing defines a rotational axis and said peripheral wall is generally circular and extends from said side wall concentric with the rotational axis of said casing, and wherein said first surface is angularly oriented relative to the rotational axis of said casing.

9. A cartridge as defined in claim 7, wherein said casing defines a rotational axis and said peripheral wall extends from said side wall and in a direction parallel to the rotational axis of said casing, and wherein said first surface is oriented at an angle relative to the rotational axis of the casing, and said second surface is arcuate and is spaced radially toward the rotational axis of the casing from said peripheral wall.

10. A cartridge as defined in claim 7, wherein said casing defines a rotational axis and said peripheral wall extends in a direction parallel to the rotational axis of said casing, and wherein said first surface is arcuate and extends generally at an angle relative to the rotational axis of the casing and said second surface is arcuate and is spaced radially from said peripheral wall toward the rotational axis of the casing.

11. A cartridge adapted to contain a roll of processed motion picture film having a leading end, the roll defining a rotational axis, the cartridge comprising: a casing having a peripheral wall and a side wall, said walls defining a chamber adapted to rotatably receive the roll of film; means within the casing and positioned radially outwardly of said chamber for supporting and retaining the leading end; means defining a passageway for the film between said supporting and retaining means and said chamber; means defining an opening extending from said supporting and retaining means exteriorly of said casing through which the leading end may be pulled from said supporting and retaining means; and guide means in said passageway and said opening for imparting a twist to the film as it passes through said passageway and opening, said guide means having two sides and comprising:
- a first curved surface on one side of said guide means defining a portion of said opening over which a first edge of one face of the film is adapted to be guided as the film is pulled from said supporting and retaining means, and
- a second surface oppositely curved with respect to said first curved surface on the other side of said guide means defining a portion of said passageway over which a second edge of the other face of the film is adapted to be guided as the film passes between said supporting and retaining means and said chamber, said second curved surface being offset in relation to said first curved surface both angularly relative to the rotational axis of the roll and radially relative to the rotational axis of the roll and said first curved surface having a radius of curvature greater than the radial distance between said first and second curved surfaces and having a generally diagonal orientation in relation to said side wall.

12. A cartridge adapted to contain a reel of strip material defining a rotational axis, the cartridge comprising:
- an outer casing defining a generally cylindrical peripheral wall and a side wall, said peripheral wall having an annular inner surface and said peripheral and side walls defining a chamber adapted to receive the reel;
- an annular rim within said casing, said rim having an annular outer surface spaced from the annular inner surface of said peripheral wall, and further having first and second edges defining an opening in said rim through which the strip material is adapted to pass into and out of said chamber; and
- first and second edges in said peripheral wall defining an opening in said peripheral wall through which said strip material is adapted to pass into and out of said chamber;
- each of said openings being disposed adjacent each other with the first edge of said peripheral wall opening and the second edge of said rim opening serving, respectively, as first and second guide edges for said strip material as it passes into and out of said chamber.

13. A cartridge as defined in claim 12, wherein said second guide edge of said rim opening is offset angularly about the rotational axis of the reel with respect to said first guide edge of said peripheral wall opening.

14. A cartridge as defined in claim 13, wherein said first guide edge of said peripheral wall opening and said second guide edge of said rim opening are arcuate and curve away from each other.

References Cited
UNITED STATES PATENTS

| | | | |
|---|---|---|---|
| 2,120,724 | 6/1938 | Williams | 242—71.2 X |
| 3,008,661 | 11/1961 | Estes et al. | 242—76 X |
| 3,346,210 | 10/1967 | Carstensen et al. | 242—71.1 |

WILLIAM S. BURDEN, Primary Examiner.

U.S. Cl. X.R.

242—76

PO-1050
(5/69)

UNITED STATES PATENT OFFICE
CERTIFICATE OF CORRECTION

Patent No. 3,451,636            Dated June 24, 1969

Inventor(s) Leslie J. Bunting

It is certified that error appears in the above-identified patent and that said Letters Patent are hereby corrected as shown below:

Column 8, line 13, "longitudinal" should read --rotational--.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents